United States Patent [19]

Petrovic

[11] Patent Number: 5,382,553
[45] Date of Patent: Jan. 17, 1995

[54] MOLYBDENUM DISILICIDE COMPOSITES REINFORCED WITH ZIRCONIA AND SILICON CARBIDE

[75] Inventor: John J. Petrovic, Los Alamos, N. Mex.

[73] Assignee: The Regents of the University of California, Alameda, Calif.

[21] Appl. No.: 191,747

[22] Filed: Feb. 2, 1994

Related U.S. Application Data

[63] Continuation of Ser. No. 893,511, Jun. 3, 1992, abandoned.

[51] Int. Cl.$^6$ .............................................. C04B 35/52
[52] U.S. Cl. ...................................................... 501/92
[58] Field of Search .................... 501/87, 88, 92, 102, 501/103

[56] References Cited

U.S. PATENT DOCUMENTS

| | | | |
|---|---|---|---|
| 4,927,792 | 5/1990 | Petrovic et al. | 501/92 |
| 4,970,179 | 11/1990 | Petrovic et al. | 501/92 |
| 5,000,896 | 3/1991 | Petrovic et al. | 264/86 |
| 5,063,182 | 11/1991 | Petrovic et al. | 501/96 |
| 5,064,789 | 11/1991 | Petrovic et al. | 501/97 |
| 5,069,841 | 12/1991 | Petrovic et al. | 264/86 |

OTHER PUBLICATIONS

J. J. Petrovic et al., "ZrO$_2$ and ZrO$_2$/SiC Particle Reinforced-MoSi$_2$ Matrix Composites." This manuscript is expected to be published in the journal Materials Science and Engineering as part of the Proceedings of the First High Temperature Structural Silicides Workshop, Nov. 4-6, 1991, National Institute of Standards and Technology, Gaithersburg, Md.

Stuart Maloy et al. "Carbon Additions to Molybdenum Disilicide: Improved High-Temperature Mechanical Properties," Journal of the American Ceramic Society, ISSN 0002-7820, vol. 74, No. 10, pp. 2704-2706 (Oct. 1991).

*Primary Examiner*—Mark L. Bell
*Assistant Examiner*—A. Wright
*Attorney, Agent, or Firm*—Richard J. Cordovano

[57] ABSTRACT

Compositions consisting essentially of molybdenum disilicide, silicon carbide, and a zirconium oxide component. The silicon carbide used in the compositions is in whisker or powder form. The zirconium oxide component is pure zirconia or partially stabilized zirconia or fully stabilized zirconia.

2 Claims, No Drawings

MOLYBDENUM DISILICIDE COMPOSITES REINFORCED WITH ZIRCONIA AND SILICON CARBIDE

This invention is the result of a contract with the Department of Energy (Contract No. W-7405-ENG-36).

This is a continuation of application Ser. No. 07/893,511 filed Jun. 3, 1992 now abandoned.

BACKGROUND OF THE INVENTION

This invention relates to the art of materials science and, more particularly, to nonmetallic materials and powder metallurgy.

Ceramic materials have certain outstanding properties, such as high temperature strength, corrosion resistance, low density, and low thermal expansion, which make them attractive materials for high temperature applications. However, ceramics differ from metals in one very important aspect: they are brittle, that is, upon loading, they do not deform before fracturing. This lack of a stress-relieving characteristic, which also causes ceramics to have low tolerance for flaws, is a major drawback to using them in high temperature structural applications.

There is a class of materials which offers the advantages of ceramics and certain of the beneficial mechanical characteristics of metals. These materials are intermetallics, which at high temperatures have the desirable properties of ceramics, but also behave mechanically like metals in that they show yielding and stress-relieving characteristics.

Molybdenum disilicide ($MoSi_2$) is an intermetallic compound which has potential for structural use in oxidizing environments at high temperatures. It has a melting point of 2030 C. and its oxidation resistance at high temperature is very good. Mechanically, $MoSi_2$ behaves as a metal at high temperatures, since it undergoes a brittle-to-ductile transition at about 900–1000 C. Thus, $MoSi_2$ has a stress relieving characteristic at high temperatures. The major problems impeding the use of $MoSi_2$ as a high temperature structural material with potential use temperatures in the range of 1200–1800 C. are its relatively low strength at high temperatures and its brittleness or lack of fracture toughness at low temperatures. Fracture toughness may be defined as resistance to fracture. At low temperatures, strength of $MoSi_2$ is limited by brittle fracture, while at high temperatures, it is limited by plastic deformation or creep. For this material to be a viable structural material at high temperatures, both its elevated temperature strength and its room temperature fracture toughness must be improved.

Zirconium oxide (zirconia, $ZrO_2$) is a ceramic which possesses high strength and high fracture toughness at room temperatures, but not at high temperatures. Composites comprised of $MoSi_2$ and $ZrO_2$ have high fracture toughness at room temperatures due to the $ZrO_2$ and at high temperatures due to the $MoSi_2$. Pure zirconia exists in a tetragonal crystalline state at high temperatures and in a monoclinic state at low temperatures. As tetragonal zirconia is cooled through its transformation temperature, there is a volume change which is sufficient to exceed elastic and fracture limits and can only be accommodated by cracking. Thus, fabrication of large components of pure zirconia is not possible because they develop cracks upon cooling. However, this volume expansion of the tetragonal to monoclinic transformation can be used to improve fracture toughness by combining zirconia with other materials. U.S. Pat. No. 5,063,182 (Petrovic et al., issued Nov. 5, 1991) teaches composites of zirconia and molybdenum disilicide.

The properties of zirconia can be modified by the addition of crystallographic stabilizing agents. These stabilizing agents include yttrium oxide ($Y_2O_3$), magnesium oxide (MgO), calcium oxide (CaO), and cerium oxide ($CeO_2$). A mixture of zirconia and stabilizing agent may be characterized as partially stabilized or fully stabilized. Partially stabilized zirconia (PSZ) remains in the tetragonal state upon cooling but will partially transform to the monoclinic state under certain circumstances. Fully stabilized zirconia (FSZ) is in the cubic crystalline state at high temperatures and remains so as it is cooled. The amounts of stabilizing agent to obtain partial stabilization and full stabilization varies with the stabilization agent used and can be determined from a phase diagram for zirconia and the stabilizing agent.

Information on zirconia is available in a publication by Magnesium Elektron LTD. of Twickenham, England entitled "An Introduction To Zirconia; Zirconia And Zirconia Ceramics," which was written by R. Stevens of the University of Leeds.

Silicon carbide (SIC) whiskers have been used to reinforce $MoSi_2$ and a composite of SiC whiskers in $MoSi_2$ exhibits improved high temperature strength, as compared to pure $MoSi_2$. U.S. Pat. Nos. 4,927,792 (Petrovic et al., issued May 22, 1990) and 5,000,896 (Petrovic et al., issued Mar. 19, 1991) teach compositions of $MoSi_2$ and SiC whiskers. Whiskers of two types are available, those made by a vapor-liquid-solid process (VLS whiskers) and those made by a vapor-solid process (VS whiskers). In accordance with the present invention, the addition of SiC, in whisker or powder form, to $MoSi_2$ reinforced with zirconia provides the resulting composite material with a further improvement in high temperature strength.

Examples of immediate applications for the inventive materials are engine turbocharger rotors, turbine engine hot section components, high temperature furnace heating elements, and adiabatic diesel engines, which do not need a cooling system. Because the room temperature electrical conductivity of $MoSi_2$ is relatively high, it may be possible to use electrodischarge machining of the inventive composites. This method of machining is significantly less expensive than the diamond machining process which is presently used for zirconia objects. Also, though zirconia will not couple to 2.45 GHz microwave radiation at room temperature, it is expected that the inventive composites will do so, so that microwave processing can be used in their manufacture.

SUMMARY OF THE INVENTION

This invention is compositions consisting essentially of molybdenum disilicide, silicon carbide, and a zirconium oxide component. The silicon carbide used in the compositions is in whisker or powder form. The zirconium oxide component is pure zirconia or partially stabilized zirconia or fully stabilized zirconia.

DESCRIPTION OF THE INVENTION

The amounts of the components present in the compositions of this invention are from about 30 to about 90 vol % of $MoSi_2$, from about 5 to about 35 vol % of SiC, and from about 5 to about 35 vol % of a zirconium oxide component. The zirconium oxide component is pure zirconia or zirconia containing up to about 10 mol % stabilizing agent, through the amount of stabilizing agent is usually no more than 8 mol %. A composite may be characterized as an $MoSi_2$ matrix with reinforcement provided by SiC and the zirconia component; $MoSi_2$ is the continuous phase even when the amount of $MoSi_2$ in a composite is as low as about 30 vol %. Composition of the inventive composites which were made and tested was 10 vol % SiC, 10 vol % zirconia component, and 80 vol % $MoSi_2$. It is believed that composites having compositions in the ranges mentioned above will be useful, as can be appreciated by review of the above mentioned U.S. patents and U.S. Pat. No. 5,069,841 (Petrovic et al., issued Dec. 3, 1991).

Inventive composites were made in the following manner. $MoSi_2$ powder was obtained from the German company H. C. Starck; it is designated Grade C and, according to the supplier's specifications, has a particle size of 0.9–1.3 micron and an oxygen content of 2 wt %. Submicron SiC powder designated as Grade A and having an average particle diameter of 0.5 micron was purchased from H. C. Starck. Zirconia, PSZ, and FSZ powders were obtained from the Tosoh Corporation of Atlanta and Tokyo. The PSZ used contained 2.5 mol % of the stabilizing agent $Y_2O_3$ and the FSZ contained 8 mol % $Y_2O_3$. SiC whiskers, instead of powder, and stabilizing agents other than $Y_2O_3$ may be used in the inventive composites. $MoSi_2$, SiC, and the zirconia component were roll blended dry in a plastic jar containing tungsten carbide balls and then dry milled for about one hour using a Megapact vibratory mill with tungsten carbide balls.

The milled material was placed in a Grafoil ® lined graphite die and hot-pressed into disks measuring approximately 31.8 mm in diameter by 6.35 mm thick. Hot pressing was performed in argon and temperatures were measured optically. The pressure applied was about 32 MPa and the specimen was heated to about 1700 C., at which point heating was stopped and a hold period started. Hold time at the peak temperature of about 1700 C. was about 30 minutes and then slow cooling was started, though it may be desirable to use a shorter hold time or a longer hold time of up to about eight hours. When the decreasing temperature reached 1200 C., the load was slowly removed and the specimen allowed to cool to room temperature. The coherent shape was then removed from the die. Densities of the specimens which were made were in the range of 91–94% of theoretical density for each composition. It is expected that the peak temperatures used in this process will fall within a range of about 1100 to about 2000 C. The pressure applied may be as high as 210 MPa or as low as 1.0 MPa or 0 MPa if pressureless sintering is used.

After hot-pressing, each specimen was hot isostatically pressed. It was not necessary to use a flexible container for the isostatic pressing, as the specimens possessed only non-interconnected porosity. The specimens were subjected to a pressure of about 207 MPa in an argon atmosphere and the temperature was raised to about 1700 C. in about one hour. After a hold period at 1700 C. of about one-half hour, each specimen was allowed to cool. The specimens were fully dense, that is, were at 100% of theoretical density. Hot isostatic pressing parameters may vary within the ranges mentioned above for the hot-pressing step. Other procedures for preparing coherent articles from the component powders are known to those skilled in the art of powder metallurgy.

Microhardness indentation fracture toughness measurements were made on polished sections of the inventive composite specimens and, for comparison, on sections of specimens consisting only of $MoSi_2$ reinforced with a zirconia component. The results are shown in Table I. Each value in the table is an average of at least three indentation fracture tests on one section cut from one specimen. Vickers indentations at different loads were employed. Fracture toughness was calculated using the formulations of Anstis et al. (G. R. Anstis, P. Chantikul, B. R. Lawn, and D. B. Marshall, J. Amer. Ceram. Soc., 64 (1981), 533).

TABLE I

| State | Load | Fracture Toughness Zirc | Zirc/SiC |
|---|---|---|---|
| pure | 20 | 5.5 (0.25) | 6.1 (0.22) |
| pure | 30 | 5.8 (0.29) | 6.7 (0.27) |
| pure | 50 | 6.1 (0.33) | 6.8 (0.35) |
| PS | 20 | 3.7 (0.30) | 3.8 (0.28) |
| PS | 30 | 4.1 (0.38) | 4.4 (0.38) |
| PS | 50 | 4.5 (0.41) | 4.9 (0.39) |
| FS | 20 | 3.3 (0.31) | 3.2 (0.31) |
| FS | 30 | 3.7 (0.42) | 3.4 (0.40) |
| FS | 50 | 4.0 (0.45) | 3.8 (0.43) |

Testing was done at room temperature. The comparison specimens consisted of 80 vol % $MoSi_2$ and 20 vol % of a zirconia component, where the zirconia component was pure zirconia or zirconia which was partially stabilized with 2.5 mol % $Y_2O_3$ or zirconia which was fully stabilized with 8 mol % $Y_2O_3$. The comparison specimens were produced by the method described in U.S. Pat. No. 5,063,182 (Petrovic et al., issued Nov. 5, 1991), which involves slip casting, comminution, and hot pressing. Table I shows fracture toughness in MPa-$m^{0.5}$ for zirconia-MoSi composites (Zirc) and the inventive composites (Zirc/SiC). The load column of the table gives the load applied in obtaining the corresponding fracture toughness value and the state column shows whether a specimen was made using pure zirconia (pure), partially stabilized zirconia (PS) or fully stabilized zirconia (FS). The numbers in parentheses after the fracture toughness values are the indentation crack lengths in millimeters. Crack length varies with the load applied during the testing. As can be seen from the table, fracture toughness increases with increasing crack length. This shows the existence of crack resistance (R-curves) toughening phenomena.

The room temperature fracture toughness of a pure $MoSi_2$ specimen using a 10 kilogram test load was measured to be 2.58 MPa-$m^{0.5}$ This value is less than any of the values shown in Table I. Reinforcement of $MoSi_2$ with unstabilized zirconia results in a toughness about 2.5 times higher than that of pure $MoSi_2$. Toughness of $MoSi_2$ reinforced with both pure zirconia and SiC is higher still, even though the amount of zirconia added is less by a factor of two (10 vol % vs. 20 vol %). Toughness values for inventive composites made with PSZ are slightly higher than those of the $MoSi_2$ reinforced only with PSZ. The values for FSZ-$MoSi_2$ composites and the inventive composites using FSZ are roughly comparable.

Four-point bend strength tests were done on inventive composites and zirconia-$MoSi_2$ composites produced as described above. Table II shows the results. Tests were done at 25, 1200, and 1400 C. and were performed in air using an Instron mechanical testing unit. This test utilizes compressive loading, which allows the test to be easily run at high temperatures. Test article dimensions were 2.54×5.08×25.4 mm. Two load points were 9.5 mm apart and the other two load points on the opposite face of the test article were 19 mm apart. Room temperature strengths, taken at about 25 C., are ultimate brittle fracture strengths. Values measured at 1200 and 1400 C. represent the stress which caused a 0.2% permanent plastic offset deviation, since the composites undergo plastic deformation at those temperatures. Each value in the table is an average of two numbers obtained from a bend strength test on each of two test articles machined from one specimen. Note that strengths of ceramics may vary widely in accordance with the type of test used to determine strength. The test equipment, methods of conducting tests, and the equation used to solve for strength values are known to those skilled in the art.

TABLE II

| Test Temp | State | Bend Strength Zirc | Zirc/SiC |
|---|---|---|---|
| 25 | pure | 280 | 240 |
| 25 | PS | 585 | 600 |
| 25 | FS | 335 | 465 |
| 1200 | pure | 100 | 285 |
| 1200 | PS | 160 | 335 |
| 1200 | FS | 150 | 230 |
| 1400 | pure | 4 | 6 |
| 1400 | PS | 8 | 10 |
| 1400 | FS | 14 | 15 |

At room temperature, the comparison specimen containing PSZ and the inventive specimen containing PSZ had similar strengths, but at 1200 C. the inventive PSZ composite was about twice as strong as the PSZ-$MoSi_2$ specimen. Pure zirconia-$MoSi_2$ specimens had slightly greater strength than pure zirconia-SiC-$MoSi_2$ composites at 25 C., but at 1200 C. inventive composites were almost three times stronger. Inventive composites using FSZ were significantly stronger than the comparison specimens using FSZ at both 25 and 1200 C. At 1400 C., bend strengths of all specimens tested were very low. It is believed that these dramatically lower levels are attributable to the presence of a glassy silicon dioxide ($SiO_2$, silica) phase which was present in all of the specimens.

The glassy phase was most prominent in the areas of $ZrO_2$ and $ZrO_2$-SiC particle clusters. It is also highly likely that the $MoSi_2$ grain boundaries contained a thin grain boundary silica phase. The glassy phase was identified as $SiO_2$ with small amounts of Zr, Y, and Mo by qualitative tunneling electron microscope analysis. It is believed that the glassy phase induces grain boundary sliding in preference to dislocation motion as a deformation mechanism. Grain boundary sliding becomes dominant as the viscosity of the glassy phase decreases with increasing temperature. It is believed that the low strengths at 1400 C. are due to this dominance of grain boundary sliding, while dislocation motion is the primary deformation mechanism at 1200 C.

The glassy silica phase is likely present because silica exists on the surfaces of the $MoSi_2$ particles used in making the composites. Addition of carbon to the inventive composites is expected to be effective in eliminating or diminishing the glassy phase by means of reactions which occur at the elevated fabrication temperatures to form SiC particles in situ and gaseous carbon monoxide, which escapes from the specimens. Preliminary test results have shown that adding 2 wt % carbon to the inventive composites results in very large increases in bend strength at 1400 C. Increased strength has been observed in $MoSi_2$-carbon specimens; this is discussed in the paper "Carbon Additions to Molybdenum Disilicide: Improved High Temperature Mechanical Properties," by Maloy, Heuer, Lewandowski, and Petrovic, J . Am. Ceram. Soc., vol. 74, pp. 2704–2706 (1991). This paper is hereby incorporated into this patent application.

From microstructural observation of the inventive specimens, it appears that no reactions occurred between the components. X-ray diffraction analyses did not indicate any reaction phases. Thus, the mixtures of $ZrO_2$, SiC, $MoSi_2$, and $Y_2O_3$ are thermodynamically stable, at least up to the processing temperatures. The absence of chemical reactions means that the tetragonal to monoclinic martensitic transformation which produces the transformation toughening is not negatively influenced by changes in composition due to chemical reactions.

It is believed that unstabilized $ZrO_2$ particles improve the toughness of a zirconia/$MoSi_2$ composite by a mechanism known as transformation toughening. Upon cooling through the tetragonal to monoclinic transformation temperature, the volume expansion of unstabilized zirconia causes microcracks to form in the $MoSi_2$ matrix. These microcracks will absorb or dissipate the energy of a crack propagating in the matrix, thereby increasing the toughness of the ceramic. Also, the transformation of unstabilized zirconia significantly increases the dislocation density in the matrix, since it takes place at a temperature above the brittle-to-ductile transition temperature of $MoSi_2$. This "dislocation pumping effect" may also contribute to increasing toughness. Reinforcement of $MoSi_2$ with particles of partially stabilized zirconia (PSZ) also provides improved low temperature fracture toughness due to transformation toughening, but the transformation toughening mechanism in PSZ is different from that of pure $ZrO_2$ and is referred to as crack tip transformation toughening. In PSZ, the tetragonal to monoclinic crystallographic martensitic transformation occurs preferentially in the stress field at crack tips and not in the bulk of the material. The volume change associated with the transformation lowers crack tip stresses, thus increasing the fracture toughness of the composite material.

It is believed that use of both a zirconia component and SiC in an $MoSi_2$ matrix results in a synergistic effect when the zirconia component is pure or partially stabilized. $MoSi_2$ has a greater coefficient of thermal expansion than SiC. This causes tensile internal stresses within a composite. Pure zirconia and PSZ in the tetragonal state are partially constrained from transforming by their location in an $MoSi_2$ matrix. Tensile internal stress in the vicinity of particles of a zirconia component facilitates transformation. Thus, tensile stresses caused by the presence of SiC induces more of the zirconia component to transform to the monoclinic state than will transform in the absence of SiC and an increased amount of transformation provides a greater transformation toughening effect.

The improvement in properties of a $MoSi_2$ matrix by adding FSZ to it is not due to transformation toughening, but is probably due to crack deflection and/or crack bridging toughening mechanisms.

The present invention is discussed in a manuscript entitled "ZrO$_2$ and ZrO$_2$/SiC Particle Reinforced-MoSi$_2$ Matrix Composites" by J. J. Petrovic et al. This manuscript is expected to be published in the journal Materials Science and Engineering as part of the Proceedings of the First High Temperature Structural Silicides Workshop, Nov. 4–6, 1991, National Institute of Standards and Technology, Gaithersburg, MD. The publication will be available from Elsevier Science Publishers of New York City. This manuscript is hereby incorporated by this reference into this patent application and constitutes a part of this application.

What is claimed is:

1. A composition consisting essentially of molybdenum disilicide, silicon carbide, and a zirconia component chosen from a group consisting of pure zirconium oxide, partially stabilized zirconium oxide, and fully stabilized zirconium oxide, where molybdenum disilicide is present in an amount of from about 30 to about 90 vol %, silicon carbide is present in an amount of from about 5 to about 35 vol %, and the zirconia component is present in an amount of from about 5 to about 35 vol %.

2. The composition of claim 1 where said partially stabilized zirconium oxide and said fully stabilized zirconium oxide each consist essentially of zirconium oxide and a stabilizing agent chosen from a group consisting of calcium oxide, cerium oxide, yttrium oxide, and magnesium oxide.

* * * * *